(12) United States Patent
Wagner et al.

(10) Patent No.: US 11,876,419 B2
(45) Date of Patent: Jan. 16, 2024

(54) ELECTRIC MOTOR FOR AIRCRAFT PROPULSION

(71) Applicant: Joby Aero, Inc., Santa Cruz, CA (US)

(72) Inventors: Jonathan Wagner, Santa Cruz, CA (US); Scott MacAfee, Santa Cruz, CA (US); Hans Leuthold, Santa Cruz, CA (US); Jeff Cortes, Santa Cruz, CA (US); Martin van der Geest, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 105 days.

(21) Appl. No.: 17/644,941

(22) Filed: Dec. 17, 2021

(65) Prior Publication Data

US 2022/0200383 A1 Jun. 23, 2022

Related U.S. Application Data

(60) Provisional application No. 63/127,580, filed on Dec. 18, 2020.

(51) Int. Cl.
*H02K 3/24* (2006.01)
*B64D 27/24* (2006.01)
(Continued)

(52) U.S. Cl.
CPC .............. *H02K 3/24* (2013.01); *B64D 27/24* (2013.01); *H02K 3/522* (2013.01); *H02K 21/22* (2013.01); *H02K 2203/09* (2013.01)

(58) Field of Classification Search
CPC .......... H02K 3/24; H02K 3/522; H02K 21/22; H02K 2203/09; H02K 9/19; H02K 9/197; B64D 27/24
See application file for complete search history.

(56) References Cited

U.S. PATENT DOCUMENTS 10,630,127 B1 * 4/2020 Thomasson ............ H02K 9/197
11,161,589 B2 11/2021 Bevirt et al.
(Continued)

FOREIGN PATENT DOCUMENTS

| DE | 102018129226 | 5/2020 |
| EP | 3214735 | 9/2017 |
| WO | 2020191167 | 9/2020 |

OTHER PUBLICATIONS

"International Application Serial No. PCT US2021 072992, International Search Report dated Mar. 28, 2022", 5 pgs.
(Continued)

*Primary Examiner* — Tulsidas C Patel
*Assistant Examiner* — Joshua Kiel M Rodriguez
(74) *Attorney, Agent, or Firm* — SCHWEGMAN LUNDBERG & WOESSNER, P.A.

(57) ABSTRACT

An electric motor comprises a rotor and a stator having a yoke. The yoke includes a plurality of teeth mounted to the yoke and being aligned substantially parallel to an axis of rotation of the motor, each tooth including a first radial end adjacent to the yoke and a second radial end extending from the yoke, a plurality of field coils, each field coil being wrapped around a tooth, and a coolant circulation path including a first coolant channel defined between adjacent field coils and a second coolant channel defined between adjacent field coils and between the first radial ends of adjacent teeth. A third coolant channel may be defined between adjacent field coils and between the second radial ends of adjacent teeth.

15 Claims, 14 Drawing Sheets

(51) Int. Cl.
  *H02K 3/52* (2006.01)
  *H02K 21/22* (2006.01)

(56) References Cited

U.S. PATENT DOCUMENTS

2009/0195092 A1* 8/2009 Gagnon .................. H02K 3/24
  310/59
2012/0175977 A1* 7/2012 Beatty ..................... H02K 3/24
  310/58
2020/0339010 A1  10/2020 Villanueva et al.

OTHER PUBLICATIONS

"International Application Serial No. PCT US2021 072992, Written Opinion dated Mar. 28, 2022", 10 pgs.
Dubois, Arthur, "Design of an Electric Propulsion System for SCEPTOR", Aviation Technology, Integration, and Operations Conference, Washington, DC, (Jun. 13, 2016).

* cited by examiner

US 11,876,419 B2

ELECTRIC MOTOR FOR AIRCRAFT PROPULSION

CROSS-REFERENCE TO RELATED APPLICATIONS

This application claims the benefit of U.S. Provisional Patent Application No. 63/127,580 filed on Dec. 18, 2020, the contents of which are incorporated herein by reference as if explicitly set forth.

TECHNICAL FIELD

This invention relates generally to electric motors for transportation, and more specifically in some examples to a new and useful electric aircraft motor in the aviation field.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
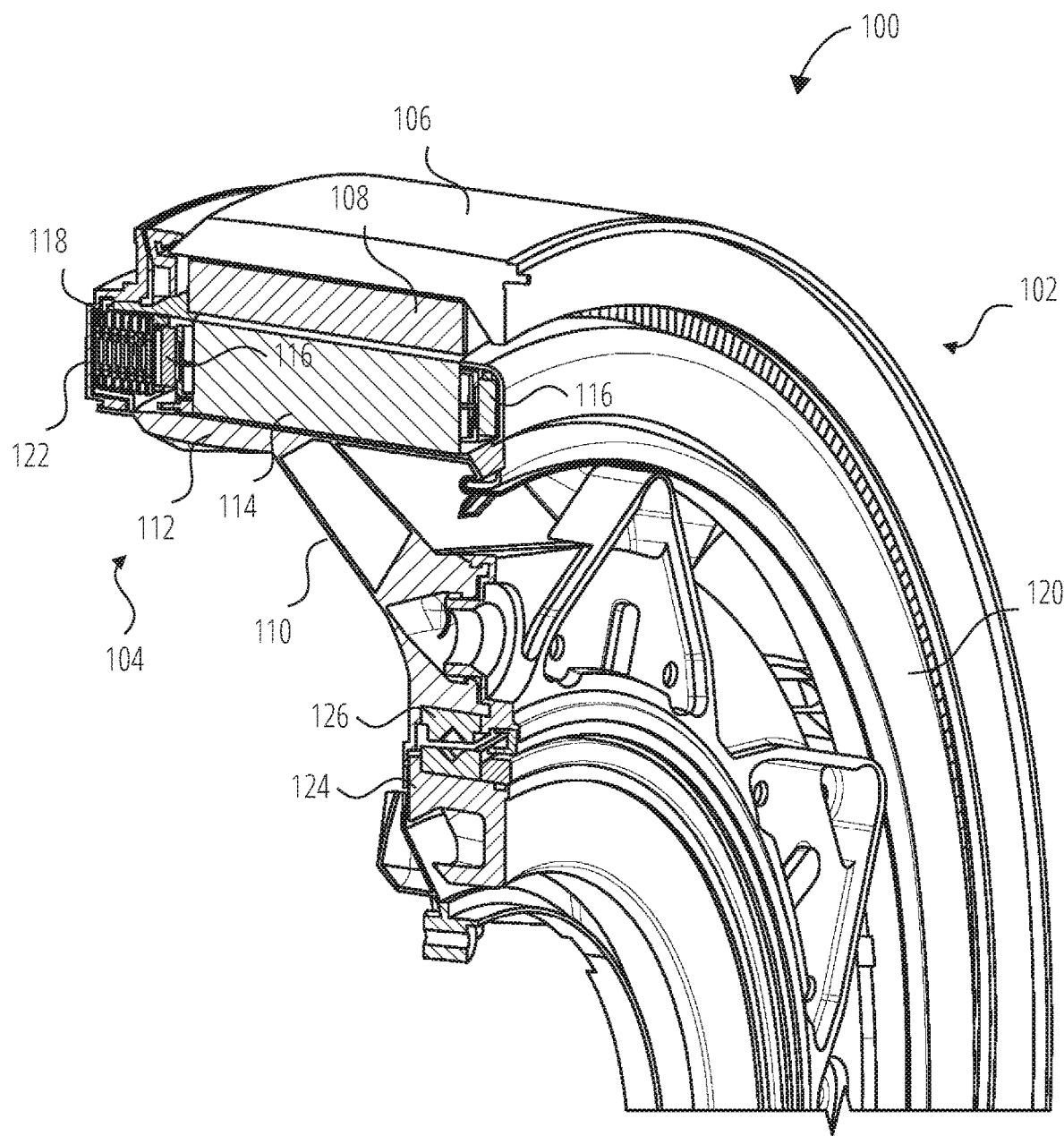
FIG. 1 is partial cross section through a perspective view of a motor according to some examples.

In some examples, an electric motor includes a rotor and a stator. The stator includes a yoke, a plurality of teeth mounted to the yoke and being aligned substantially parallel to an axis of rotation of the motor, each tooth including a first radial end adjacent to the yoke and a second radial end extending from the yoke, a plurality of field coils, each field coil being wrapped around a tooth, and a coolant circulation path including a first coolant channel defined between adjacent field coils and a second coolant channel defined between adjacent field coils and between the first radial ends of adjacent teeth.

The plurality of teeth may include first axial ends and second axial ends, and the motor may further include a radial baffle at the first axial end of a tooth. The electric motor may also further include a third coolant channel defined between adjacent field coils and between the second radial ends of adjacent teeth. An axial baffle may partly define the third coolant channel. The electric motor may also further include electrical bussing including a number of bus rings, the coolant circulation path passing through the bus rings.

A radial baffle may in use direct coolant flow between the first axial end of a tooth and a corresponding field coil. Also provided may be a circumferential baffle around the first axial ends or around the second axial ends of the plurality of teeth, wherein the circumferential baffle in use directs coolant flow around outer ends of the plurality of field coils.

The plurality of teeth may include circumferential flanges, where the axial baffle is partly retained by the circumferential flanges of adjacent teeth.

In some examples, the stator includes a yoke, a plurality of teeth being aligned substantially parallel to an axis of rotation of the motor, each tooth including a first radial end adjacent to the yoke and a second radial end extending from the yoke, a plurality of field coils, each field coil being wrapped around a tooth, and a coolant circulation path including a first coolant channel defined below the field coils and between the first radial ends of adjacent teeth and a second coolant channel defined above the field coils and between the second radial ends of adjacent teeth. A third coolant channel may also be defined between adjacent field coils. An axial baffle may partly define the third coolant channel.

The electric motor may also further include a circumferential baffle around axial ends of the plurality of teeth, where the circumferential baffle in use directs coolant flow around outer ends of the plurality of field coils. Electrical bussing including a number of bus rings may also be provided, the coolant circulation path passing between the bus rings.

The plurality of teeth may include first axial ends and second axial ends, and a radial baffle may be provided at a first axial end of a tooth. The radial baffle in use may direct coolant flow between the first axial end of a tooth and a corresponding field coil.

Also provided is a method of cooling an electric motor including a rotor and a stator, the stator including a yoke, a plurality of teeth being aligned substantially parallel to an axis of rotation of the motor, each tooth includes a first radial end adjacent to the yoke and a second radial end extending from the yoke, and a plurality of field coils, each field coil being wrapped around a tooth, the method comprising circulating a coolant through a coolant circulation path including a first coolant channel defined between adjacent field coils and a second coolant channel defined between adjacent field coils and between the first radial ends of adjacent teeth. The method may further include circulating a coolant through a third coolant channel defined between adjacent field coils and between the second radial ends of adjacent teeth.

The motor may include electrical bussing including a number of bus rings, the method further including circulating the coolant between the bus rings. The method may further include circulating the coolant between an axial end of a tooth and a corresponding field coil, and circulating the coolant over an outer end of the corresponding field coil.

Other technical features may be readily apparent to one skilled in the art from the following figures, descriptions, and claims.

FIG. 1 is partial cross section through a perspective view of a motor 100 according to some examples. The motor 100 includes a rotor 102 around a stator 104. The rotor 102 includes a rotor body 106 and a plurality of magnets 108. The stator 104 includes a stator housing 110 and a yoke 112 that supports a plurality of teeth 114 around which are wound field coils 116. The stator also includes electrical bussing 118 for routing current to and from the field coils 116. As will be discussed below, the stator 104 also includes various cooling channels through which a coolant can be circulated to cool the field coils 116 and the electrical bussing 118 in use. The coolant channels may be coupled to a pump (not shown) to circulate the coolant through the coolant channels, as well as to a radiator (not show) or other heat transfer device.

Also provided on the yoke 112 are a front wall 120 and a rear wall 122 that serve to retain the coolant as it leaves and enters the regions around the field coils 116 and electrical bussing 118. For purposes of convenience only, the side of the motor 100 having the electrical bussing 118 is referred to herein as the back side.

The rotor 102 is coupled to a hub 124, which is in turn rotationally coupled to the stator 104 via a bearing 126. The hub 124 is in turn coupled to a driven component such as a shaft or propeller hub, while the stator is coupled via a housing (not shown) to supporting structure such as an airframe, nacelle structure or a tilt mechanism.

The stator 104 functions to generate a magnetic field. The interaction of the magnetic field with the magnets 108 of the rotor 102 creates motor torque that operates on the driven component via the hub 124.

The yoke 112 functions to structurally support the teeth 114 and the field coils 116, and to mount the teeth 114 and field coils 116 to the stator housing 110. Additionally or alternatively, the yoke 112 can function to close out a portion of the coolant routing. The yoke 112 in the illustrated example is cylindrical and arranged radially outward of the stator housing 110. The yoke 112 can be mounted to the stator housing 110 at an outer periphery (outer diameter) of the stator housing 110 by a bonding agent (e.g., epoxy), retained by mechanical stress (e.g., press-fit, mechanical preload of sleeve, etc.), mechanical fastening, and/or otherwise mounted to the stator housing. The yoke 112 can be of unitary construction and/or assembled from a plurality of layered components. In a specific example, the yoke 112 is formed by layering a plurality of sheet metal components and affixing them together using a bonding agent (e.g., epoxy). The yoke 112 is preferably formed with a ferrous metal (e.g., steel, etc.), but can additionally or alternately be formed with a non-ferrous metal, and/or other suitable materials.

In variants, the yoke 112 can include a plurality of grooves each configured to mesh with or mount a base of a tooth 114. The grooves are preferably arranged on the radially outward periphery of the yoke 112, extending axially along the cylindrical exterior of the yoke 112. The grooves preferably have a uniform radial spacing about the central axis (corresponding to the number and arrangement of field coils), but can be otherwise suitably configured. The grooves can be V-shaped or otherwise configured to enable assembly of the teeth therein. In a first example, the grooves include no overhangs, enabling radial insertion/assembly of the teeth therein. In a second example, the grooves include overhangs (e.g., precluding radial insertion of teeth), requiring axial insertion of teeth therein. Alternately, the teeth 114 can be integrally formed with the yoke 112 and/or otherwise suitably attached to the yoke 112.

The teeth, which function to retain the field coils 116, can be integrated into the yoke 112 and/or separate from the yoke 112 (e.g., mechanically connected to the yoke). The teeth 114 can be the same material as the yoke 112 and/or formed with a different material as the yoke 112. Each tooth 114 can be of unitary construction and/or assembled from a plurality of layered components. In a specific example, each tooth 114 is formed by layering a plurality of sheet metal components which can be affixed together using a bonding agent (e.g., epoxy). The teeth 114 are preferably formed from a ferrous metal (e.g., steel, etc.), but can additionally or alternately be formed with a non-ferrous metal, and/or other suitable materials. Each tooth 114 is preferably a 'T-shape', with opposing flanges extending circumferentially at the outer edge of the body of the tooth 114, the body of the tooth terminating in a root that is configured to mesh/interface with a base of a groove on the radial periphery of the yoke 112. The flanges of the tooth 114 can retain the field coils 116 in a radial direction while the body of the tooth 114 retains the field coils 116 in an axial direction and/or rotationally about the axis of the motor.

The electrical bussing 118 functions to electrically connect subsets of the field coils 116 and/or route power between the field coils 116. Electrical bussing can achieve any suitable power configuration of the motor. The motor is preferably powered by an AC power input, but can alternately be powered by a DC power input (e.g., brushless DC motor with an integrated inverter). More preferably, the AC power input is 3 phase, but can additionally or alternatively be single phase, 2-phase, 6-phase, 9-phase, multi-phase, and/or can include any suitable number of electrical phases.

In a first variant ('dual wound variant'), the electrical bussing 118 preferably subdivides the field coils into a first and second set of windings (e.g., 2 sets of 3 phase windings) which can be separately powered and/or separately drive rotation of the motor 100. Preferably, adjacent field coils 116 are in opposing sets of windings, however the field coils can be otherwise suitably distributed to enable independent and/or separate actuation via each set of windings. Accordingly, each set of windings can be powered by a separate inverter and/or can be powered by the same inverter. The dual wound variant can provide an additional layer of redundancy, since a single point of electrical failure (either within the motor and/or at the inverter) can compromise only a single set of windings. In variants, each set of windings and/or each inverter can be powered by a separate set of power sources (e.g., separate sets of battery packs), which can similarly allow the motor to continue operating even with the loss of one or more power sources. In a specific example, the bussing divides the motor 100 circuit into equal partial motors dividing stator and windings (e.g., like 'pie slices') which are controlled by two independent phase control schemes. However, the motor can alternately include only a single set of windings (e.g., one set of three phase windings), include more than two sets of windings, and/or be otherwise suitably configured.

The components of the motor 100 can cooperatively define one or more coolant flow paths within the motor 100, which function to route coolant therethrough. The system can include a single coolant (e.g., water/glycol mixture, oil, etc.) and/or multiple coolants. In a first variant, the bearing 126 is cooled by first coolant (e.g., oil) circulating through a first coolant flow path and the stator 104 is cooled by a second coolant (e.g., water/glycol mixture) circulating through a second flow path. In a second variant, both the bearing and the stator can be cooled by the same coolant (e.g., oil).

The coolant flow paths can include or be defined by coolant routing components. Coolant routing components can include: coolant baffles (e.g. located on opposing ends of the field coils—i.e. front coolant baffle and rear coolant baffle) and channels formed within other components within the motor 100 such as in the yoke 112.

Coolant routing can be between adjacent field coils 116, under (e.g., radially inwards of field coils 116, above (e.g., radially outwards of field coils), inside of field coils 116 (e.g., between field coil and tooth, such as at a forward/rearward end of the field coils 116), forward of field coils, rearward of field coils (on electrical bussing side and/or mounting side), and/or any other suitable portion of field coils. Coolant routing is preferably provided with a substantially uniform (e.g., varying by less than 10%, 20%, 50%, exactly uniform, etc.) and/or constant cross-sectional area across various portions of the coolant flow path. Providing cooling across a multitude of cooling surfaces can increase the cooling surface area to flow path volume, thereby improving the overall cooling efficiency. Coolant is preferably circulated through the coolant routing components at a high flow rate (e.g., such that coolant temperature rise through the motor can be neglected in some cases; where coolant temperature rises less than 5 deg C. through the motor; etc.).

The front wall 120 and the rear wall 122 function to close out front and rear portions of the air gap between the rotor 102 and the stator 104 and/or function to prevent particulate ingress into the air gap from the front or rear. The front and rear walls are preferably mechanically mounted to the stator housing 110 (e.g., by mechanical fasteners and/or bonding agent), and interfaces with the rotor body 106. The front wall 120 and the rear wall 122 are preferably formed with a composite material (e.g., carbon fiber), but can include any other suitable materials and/or be otherwise implemented. The interface between the rotor body and the front and rear walls preferably includes a bearing seal and/or bearing surface (e.g., engaged during rotation of the rotor body), which can be lubricated by a lubricant (e.g., grease), self-lubricating (e.g., with impregnated oil, graphite, etc.), and/or otherwise suitably enable the relative motion between the rear wall and the rotor body.

Figure 2:
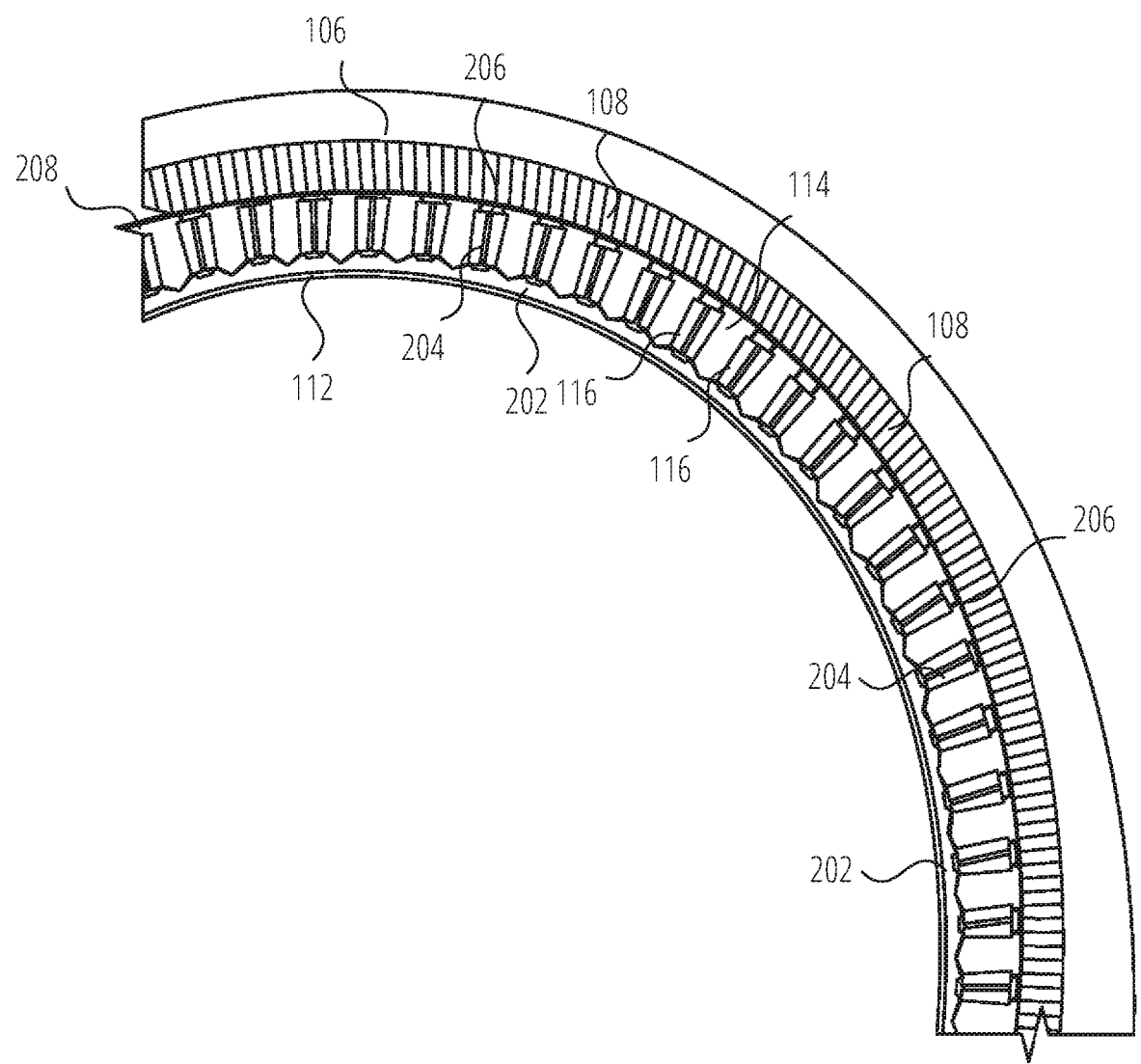
FIG. 2 is a plan view of the yoke and rotor body of the motor of FIG. 1 according to some examples.

FIG. 2 is a plan view of the yoke 112 and rotor body 106 of the motor 100 according to some examples. The yoke 112 is shown in cross section to illustrate the location of cooling channels relative to the various components. The cooling channels illustrated in FIG. 2 run axially along the yoke 112 parallel to the axis of rotation of the motor 100. As can be seen from in FIG. 2 and shown in more detail in FIG. 3 and in FIG. 4 in particular, each field coil 116 is wrapped around a tooth 114. Each tooth includes a radial first end 412 at a root or base of the tooth and a radial second end 410 that extends from the yoke 112. The second end 410 includes a flange 408 on each side.

An inner cooling channel 202 is defined in the yoke 112 between adjacent teeth 114, and radially inward of adjacent field coils 116 between the first ends 412 of adjacent teeth 114. An interstitial cooling channel 204 is defined between adjacent field coils 116, and an outer cooling channel 206 is defined radially outward of adjacent field coils 116 between the second ends 410 of adjacent teeth. It should be noted that the terms radially inward and outward are only being used to describe the current examples, and these orientations could be reversed, for example if the stator surrounded the rotor.

Also shown in FIG. 2 is a sleeve 208, which functions to radially enclose the teeth 114 and field coils 116 at an air gap between the yoke 112 and the rotor body 106 and magnets 108. Additionally or alternately, the sleeve 208 can function to partially enclose a coolant volume and/or direct coolant along a flow path to the field coils (e.g., in conjunction with coolant baffles). The air gap is preferably the physical separation between the rotor 102 and stator 104 that allows relative rotation of the two bodies (e.g., defining an annular cavity between the stator 104 and the rotor 102), where the sleeve 208 separates the stator 104 from the air gap.

The sleeve 208 is preferably formed from a composite material (e.g., carbon fiber), but can additionally or alternately have any other suitable material construction. The sleeve 208 is preferably formed with a single layer of composite material, however it can be multi-layered (e.g., single fiber direction, multiple fiber directions, etc.), and/or of other material construction. The sleeve 208 preferably includes a cylindrical wall extending through the air gap between the radially-outward faces of the teeth 114 and the magnets 108. The cylindrical wall can extend radially outward over the electrical bussing 118 and/or terminate between the field coils 116 and the rear wall 122. The sleeve 208 can additionally include an inner flange (e.g., concentric with the cylindrical wall and extending axially in the same direction as the cylindrical wall), which mounts to the stator housing 110.

In a first variant, the sleeve mounts the yoke 112, teeth 114, and field coils 116 to the stator housing 110 by mechanical preload. In a specific example, the nominal inner diameter of the cylindrical wall of the sleeve 208 is preferably smaller than the nominal outer diameter of the teeth/field coil assembly. Accordingly, the sleeve 208 is pre-tensioned during assembly, and is continuously stressed as it retains the field coils 116 and teeth 114 against the stator housing 110. In a second variant, the sleeve 208 can be connected to the stator housing 110 and/or the stator 104 by a bonding agent (e.g., epoxy). However, the system can include any other suitable sleeve.

Accordingly, the sleeve 208, stator housing 110 and yoke can form part of a fluid boundary and/or enclose coolant within the motor 100. Additionally, coolant baffles can likewise structurally support various components of the system—such as providing a mounting structure for electrical bussing (e.g., ladder-shaped bus ring mounts integrated into rear baffle). However, coolant routing components can include any other suitable components, such as external tubing and/or coolant connections (e.g., directed toward motor inverter, pump, and/or radiator).

Figure 3:
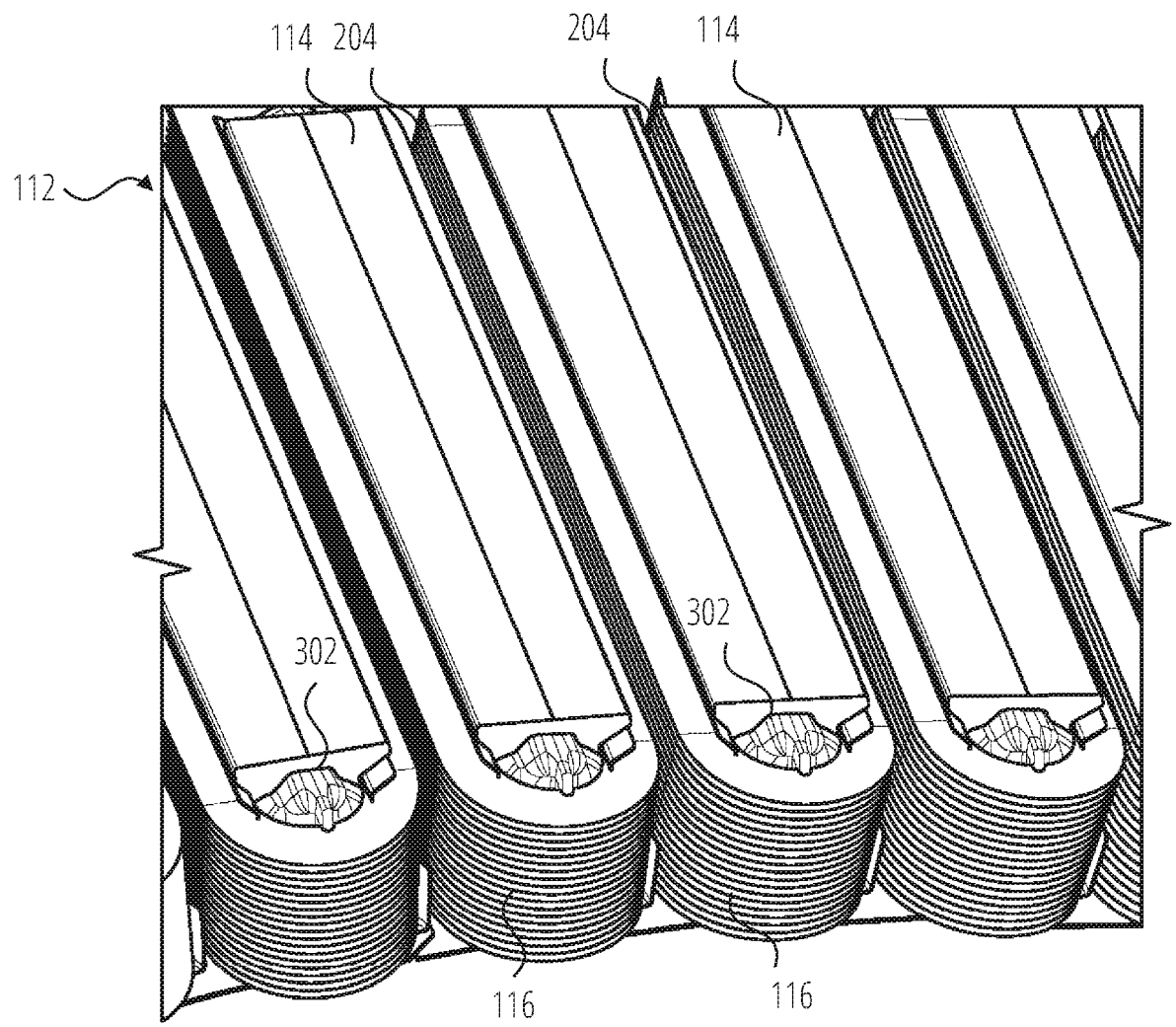
FIG. 3 is a perspective view of a segment of the yoke of the motor according to some examples.

FIG. 3 is a perspective view of a segment of the yoke 112 of the motor 100 according to some examples. FIG. 3 shows more explicitly how the field coils 116 are wrapped around the teeth 114, with the interstitial cooling channels 204 being defined between adjacent field coil 116. Also illustrated in FIG. 3 are radial baffles 302 that are mounted to the ends of each tooth 114 at both the front and rear sides of the yoke 112. The radial baffles 302 are lightweight and serve both to reduce the volume of coolant that would otherwise accumulate between the ends of the teeth 114 and the field coils 116, and to direct the coolant flow as will be discussed in more detail below.

The field coils 116 are preferably copper, but can include any suitable material(s) and/or coatings. In a first variant, the field coils 116 are formed with copper wire wound around the teeth 114. In a second variant, each field coil 116 is formed by stacking loops of strip winding along the length of the tooth 114 as shown in FIG. 3. Stacked/layered strip winding can be interleaved with an insulation layer separating the winding from the tooth (e.g., Nomex®) and/or otherwise suitably electrically isolated. In a further example, the stacked strip winding can be assembled onto the body of each tooth 114 prior to the tooth 114 being mechanically connected/bonded to the yoke 112.

Figure 4:
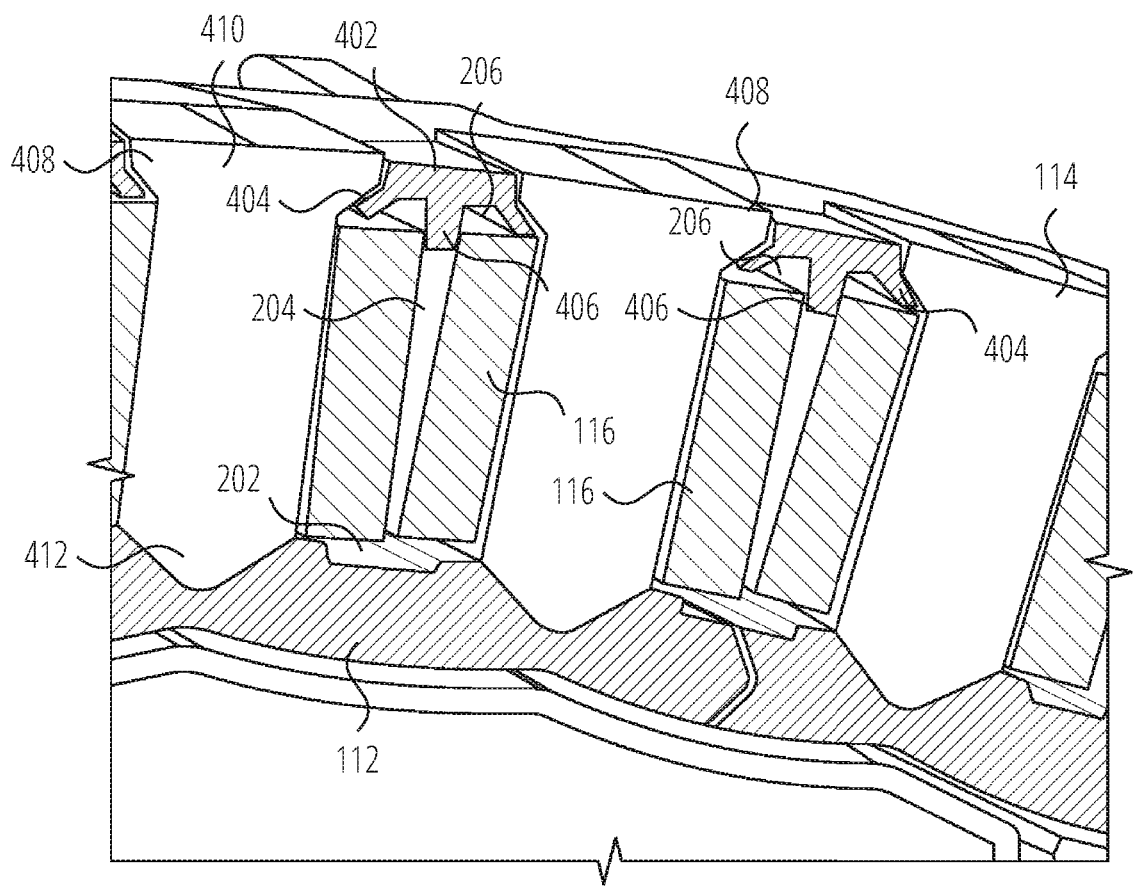
FIG. 4 is a perspective cross-sectional view of a segment of the yoke of the motor according to some examples.

FIG. 4 is a perspective cross-sectional view of a segment of the yoke 112 of the motor 100 according to some examples. FIG. 4 shows more explicitly the location of an inner cooling channel 202 that is located radially inwardly of adjacent field coils 116 between the first ends 412 of adjacent teeth. Also shown are the interstitial cooling channels 204 defined between adjacent field coils 116, and the outer cooling channels 206 located radially outwardly of adjacent field coils 116.

Also illustrated in FIG. 4 are axial baffles 402 that run along the length of each tooth to keep the cooling fluid in the interstitial cooling channels 204, and which also serve partly to define the outer cooling channels 206. As can be seen, each axial baffle 402 includes a central divider 406 that extends into the outer portion of the gap between adjacent field coils 116 to keep coolant in the interstitial cooling channel 204 in a channel above each field coil 116. Each axial baffle 402 also includes wings 404 that extend under the axial flanges 408 of adjacent teeth 114. The flanges 408 serve partly to define the outer cooling channel 206 and to retain the axial baffles 402 in place.

Figure 5:
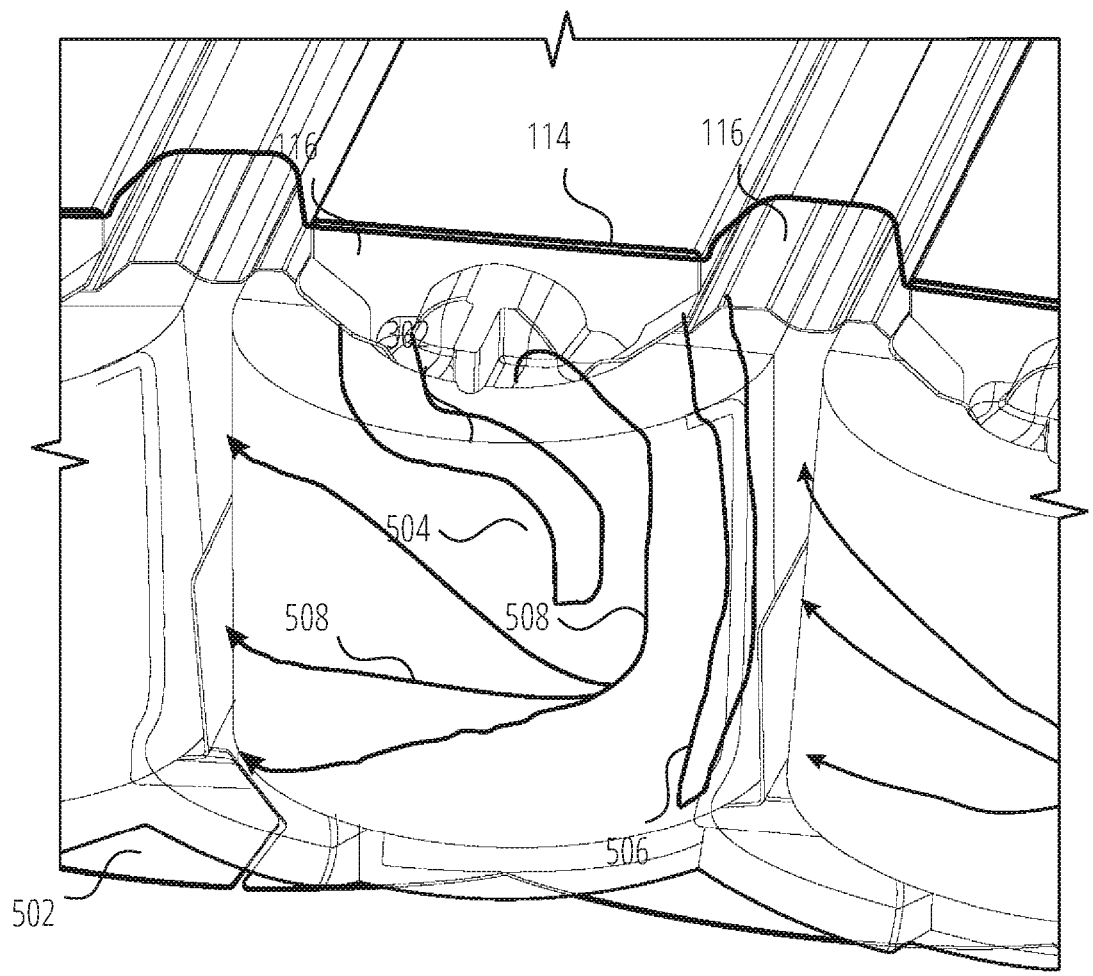
FIG. 5 is a perspective partially translucent view of a circumferential baffle for routing coolant in the motor according to some examples.

FIG. 5 is a perspective partially translucent view of a circumferential baffle 502 for routing coolant in the motor 100 according to some examples. The circumferential baffle 502 covers the front and back ends of the teeth 114 and field coils 116. The circumferential baffle 502 may be provided in a number of segments that together provide coolant containment and routing at the front and back ends of the field coils all around the front and back sides of the yoke 112. The circumferential baffle 502 includes guides 504 and guides 506 for each tooth 114, that serve to route incoming fluid towards the inner cooling channel 202, interstitial cooling channel 204 and outer cooling channel 206 and, at the other end, serve to route outgoing fluid leaving the inner cooling channel 202, interstitial cooling channel 204 and outer cooling channel 206 to the electrical bussing 118.

FIG. 5 illustrates the incoming flow of coolant—the outgoing flow at the other side of the yoke occurs in reverse. Referring to the orientation of the circumferential baffle 502 illustrated in FIG. 5, fluid enters through a port in the underside of the circumferential baffle 502 and flows initially between the radial baffle 302 and the field coil 116. Upon leaving the space between the radial baffle 302 and the end of the field coil 116, the coolant flow 508 is directed over the top edge of the field coil and down the outside end of the field coil 116 by the upper edge of the circumferential baffle 502, the wall 608 of the circumferential baffle 502 (see FIG. 6), the guide 504 and the guide 506. The coolant then flows left in the figure around the end of the field coil 116 and enters an inner cooling channel 202, an interstitial cooling channel 204 and an outer cooling channel 206.

The flow of the coolant up, over, around and down the end of the field coil 116 provides initial heat transfer from the field coil to the coolant fluid as it enters the motor 100.

Figure 6:
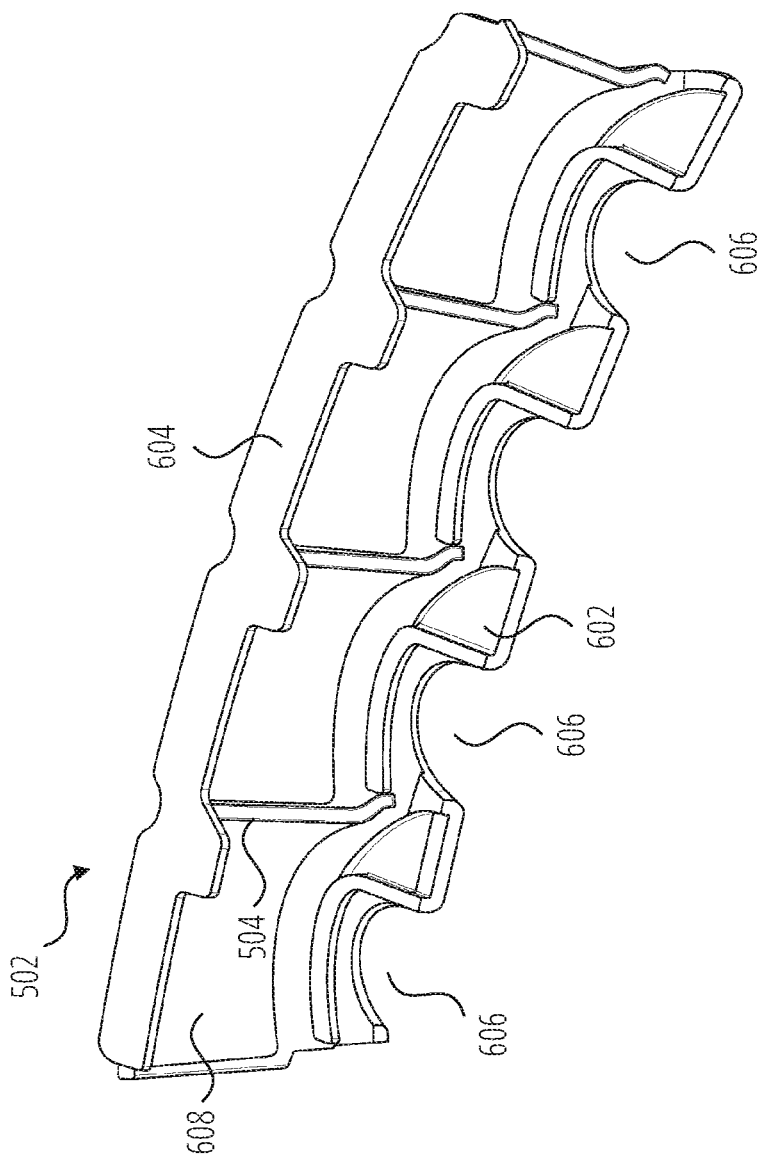
FIG. 6 is a perspective view of a segment comprising the circumferential baffle of FIG. 4.

FIG. 6 is a perspective view of a segment comprising the circumferential baffle 502 of FIG. 4. As can be seen, the circumferential baffle 502 includes a wall 608 and a radially inner edge 602 and a radially outer edge 604. In FIG. 5 and FIG. 6, the inner edge 602 is the "lower" edge while the outer edge 604 is the "upper" edge.

Also shown in FIG. 6 is the guide 504 that keeps the flow of coolant separated from the adjacent set of field coils 116, as well as the ports 606 through which the coolant enters or exits, depending on the end of the yoke 112 to which the circumferential baffle 502 is mounted.

Figure 7:
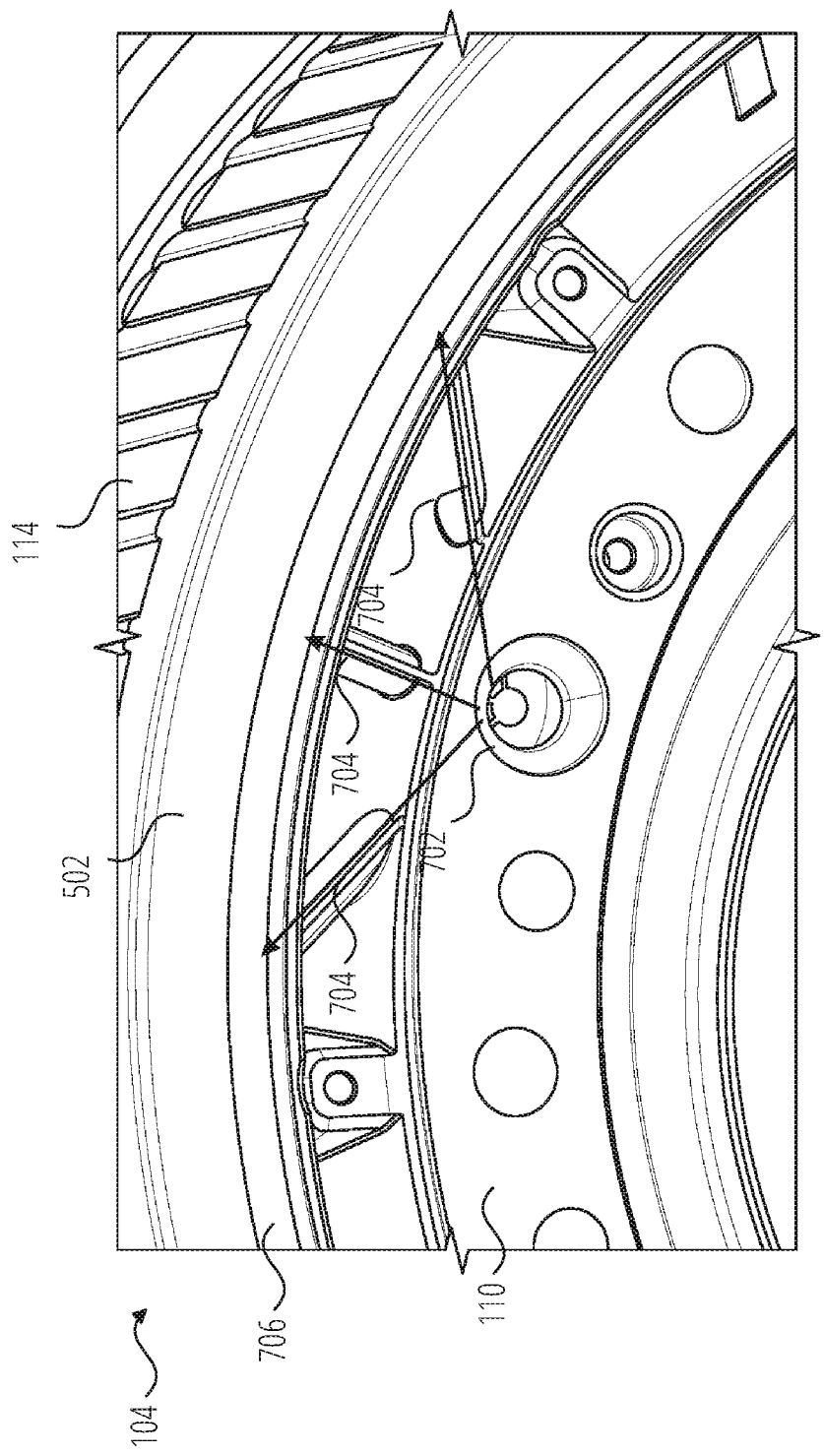
FIG. 7 is a perspective view of the stator of the motor showing an inlet and fluid channels according to some examples.

FIG. 7 is a perspective view of the stator 104 of the motor 100 showing an inlet 702 and fluid channels 704 according to some examples. As can be seen from the figure, the stator housing 110 has an inlet defined therein into which coolant flows in use. The coolant then travels outward along a number of channels 704 and flows into an annular region 706 partly defined by the front wall 120 and located radially inward of the circumferential baffle 502. From the annular region 706, the coolant can flow outward into the circumferential baffle 502 through the ports 606 as described above. One or more of such inlets 702 and channels 704 can be provided around the stator housing 110 to distribute the flow of coolant into and around the stator housing 110. A similar configuration may be provided on the back side of the motor 100, from which the coolant exits the stator 104.

Figure 8:
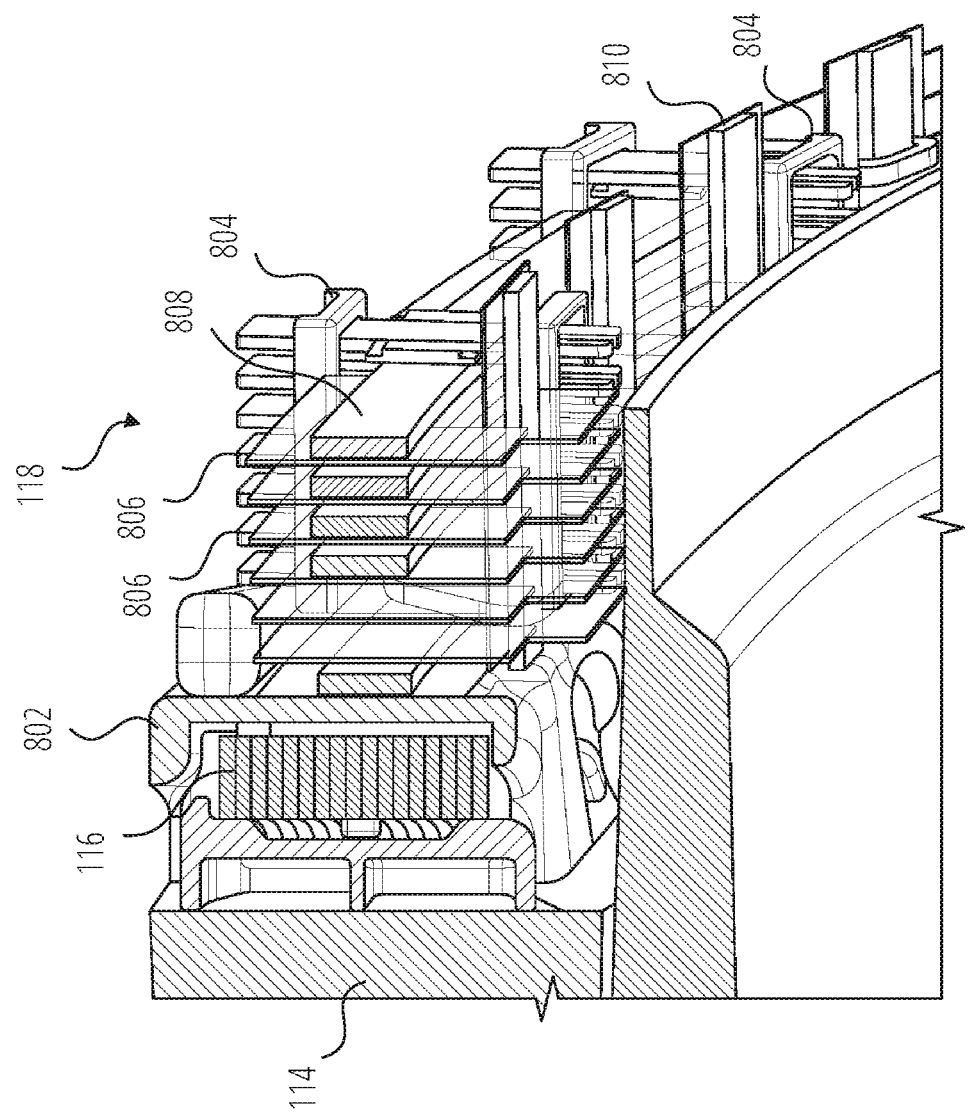
FIG. 8 is a cutaway perspective view of the electrical bussing of the motor of FIG. 1, according to some examples.

FIG. 8 is a cutaway perspective view of the electrical bussing 118 of the motor 100 of FIG. 1, according to some examples. Show in the figure are an axial cross section of a tooth 114, a field coil 116 and a circumferential baffle 802 located on the rear side of the motor 100. The electrical bussing 118 includes a mounting structure comprising a number of spaced-apart mounting beams 804 that project axially from the back side of the circumferential baffle 802. A number of spacers 806 span the gap between the upper and lower mounting beams 804. Individual bus rings 808 are in turn held between adjacent spacers 806. Also shown in FIG. 8 is a field coil terminal 810 that provides electrical connectivity to one or a set of field coils 116.

The electrical bussing 118 is preferably arranged on a rear portion of the motor 100 and/or inboard portion of the motor 100, but can additionally or alternately be formed on the front side, radially inward of the stator housing 110, and/or otherwise suitably configured.

The electrical bussing 118 can include a set of motor terminals (e.g., one terminal associated with each phase of the motor for each set of windings) and a set of electrical connections connecting the field coil terminals, such as field coil terminal 810. In a first variant, the electrical connections can be formed by a set of bus rings 808 (e.g., sheet metal connections) extending circumferentially around the motor axis (at substantially the same radial position as the field coils 116 and axially offset from the field coils 116—such as on an inboard side of the motor 100). The broad faces of the bus rings 808 are preferably parallel to a broad face of the motor 100 and/or perpendicular to the motor axis, but can be otherwise suitably configured.

The bus rings 808 can be flat and/or formed by sheet metal (e.g., laser cut sheet metal, punched/stamped sheet metal, etc.), but can be otherwise formed. The bus rings 808 electrically interconnect field coil terminals 810 associated with a single motor winding and phase of the motor 100. In a specific example, for a dual wound motor with three phases, the bus rings 808 electrically interconnect every sixth field coil 116. The electrical connections can be structurally supported by sets of 'ladder' shaped mounting beams 804, which include a plurality of holes/slots (e.g., directed radially toward the motor axis). The mounting beams 804 can extend axially at radial intervals about the motor, with a first mounting beam 804 radially outward of the bus rings 808 and a second mounting beam 804 radially inward of the bus rings 808. The mounting beams 804 are preferably electrically non-conductive and/or electrically insulating (e.g., greater than 100x the electrical resistance of the bus rings), but can be electrically conductive and/or formed with any suitable materials. In a specific example, the mounting beams 804 can be integrated into the coolant routing components (e.g., protruding axially from a rear portion of the circumferential baffle 802 as shown in FIG. 8).

The bus rings 808 are mounted to the mounting beams 804 by the spacers 806 extending through corresponding slots of a set of upper and lower mounting beams 804, and an insulation material. The bus rings 808 are then 'stacked' (in order of those closest to the field coils), and the spacers 806 inserted through the mounting beams 804 (orthogonally to the direction of stacking) to retain the bus rings 808 in place. Additionally, an insulation layer (e.g., plastic) can be interleaved between the bus ring and the spacer 806 and/or the bus rings 808 can be mounted to the spacers 806 (e.g., by heat staking, using a bonding agent, etc.).

The electrical bussing 118, field coils 116, yoke 112, and/or teeth 114, can be structurally reinforced and/or electrically insulated by applying an epoxy or other coating uniformly over any suitable portions of the assembly. The epoxy can be flooded throughout and/or uniformly coated (e.g., by flooding the assembly and then spinning the assembly, such as within a vacuum chamber).

Figure 9:
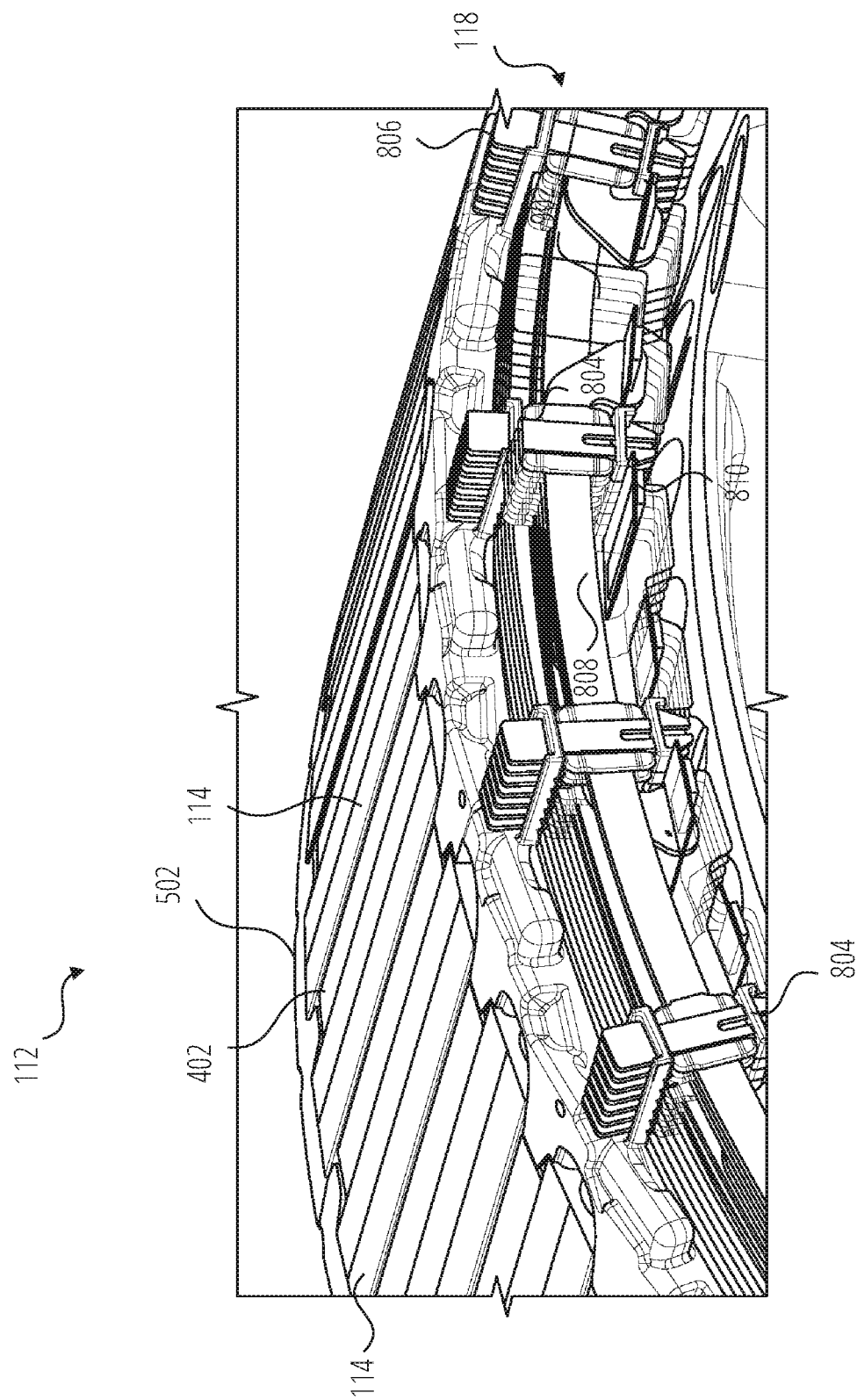
FIG. 9 is a perspective view of the yoke of the motor according to some examples.

FIG. 9 is a perspective view of the yoke 112 of a motor 100 according to some examples. Shown are the teeth 114, the axial baffles 402 between the teeth above the field coils 116, the circumferential baffle 502, the circumferential baffle 802 and the electrical bussing 118. As discussed with reference to FIG. 8, the electrical bussing 118 includes mounting beams 804, spacers 806, bus rings 808 and field coil terminals 810. As shown in FIG. 9, the bus rings 808 include tabs 902 for connecting to field coil terminals 810 or to motor terminals (not shown). Also, for clarity, not shown is the sleeve 208 discussed above with reference to FIG. 2.

The flow of the coolant through the motor will now be discussed with reference to FIGS. 7 and 10 to 14 in particular.

Figure 10:
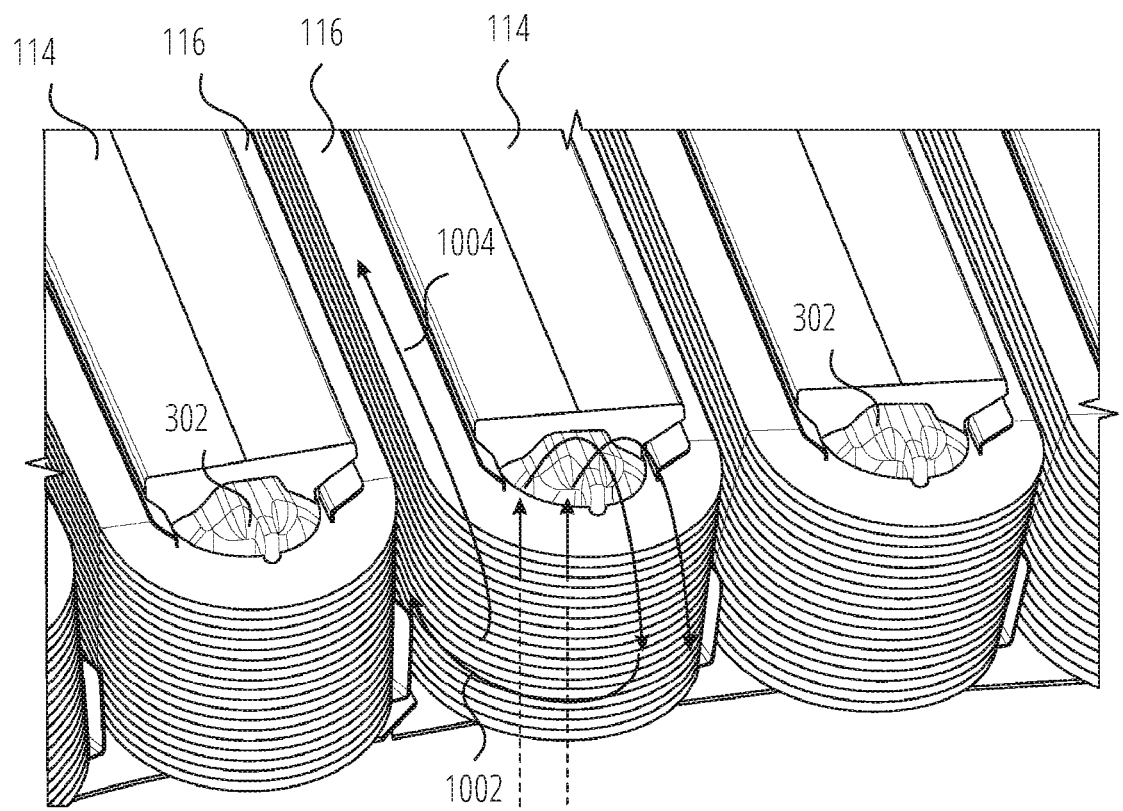
FIG. 10 shows the flow of the coolant around the end of the field coils as it enters from the channels illustrated in FIG. 7 according to some examples.

FIG. 10 shows the flow of the coolant around the end of the field coils 116 as it enters from the channels 704 illustrated in FIG. 7. The coolant is discussed with reference to one set of adjacent field coils 116 and teeth 114 but of course it will be appreciated that this happens to all similarly-configured teeth and field coils in the yoke 112. The coolant enters the stator housing 110 and flows radially outward from the channels 704 into the annular region 706, and from there through the ports 606 to the field coils 116. The coolant enters the field coils 116 between the radial baffles 302 and the ends of the field coils 116. The coolant then passes over the ends of the field coils 116 and then flows around the end of the field coil 116 between the end of the field coil and the circumferential baffle 502 as discussed with reference to FIG. 5. The coolant flow then separates into an inner flow 1102 in an inner cooling channel 202, an interstitial flow 1002 in an interstitial cooling channel 204 and an outer flow 1004 in an outer cooling channel 206.

Figure 11:
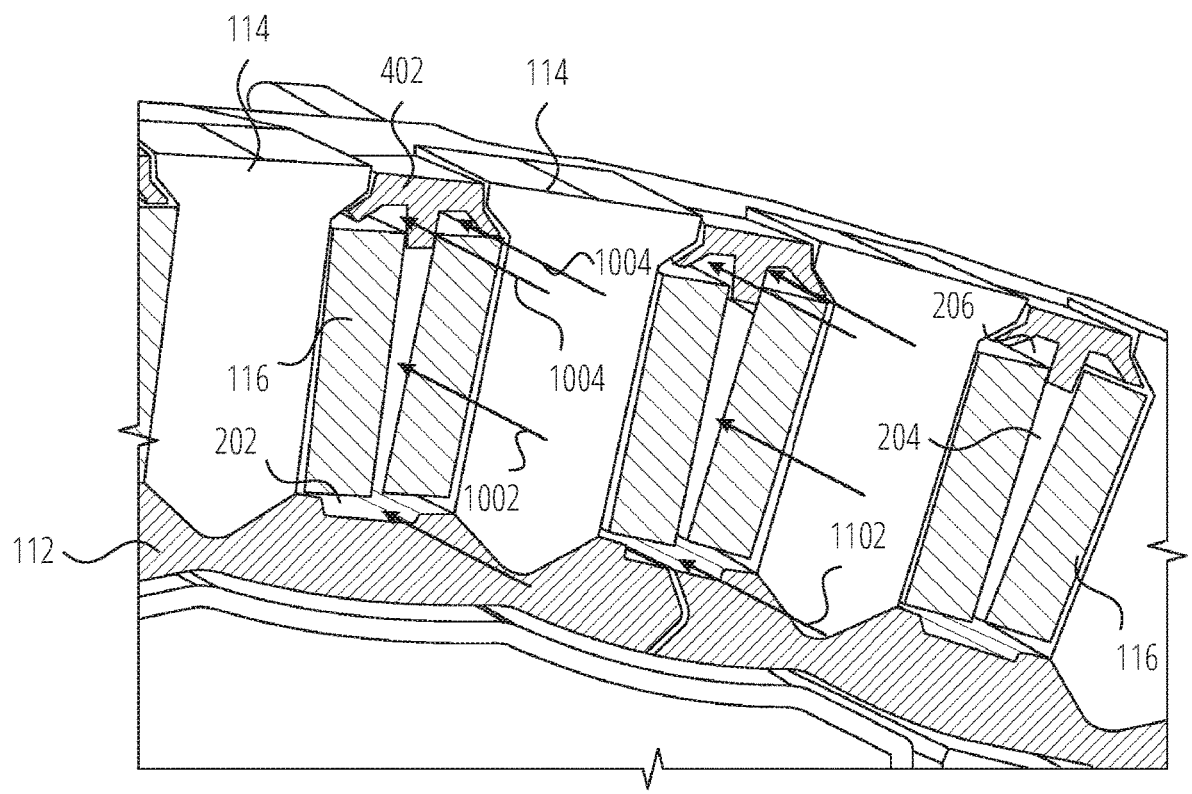
FIG. 11 shows the flow of the coolant axially between the teeth of the stator according to some examples.

FIG. 11 shows the flow of the coolant axially between the teeth 114 of the stator 104. As can be seen, the inner flow 1102 flows underneath (in FIG. 11) adjacent field coils 116 in the inner cooling channel 202. Interstitial flow 1002 flows between adjacent field coils 116 in the interstitial cooling channel 204, while the outer flow 1004 flows above (in FIG. 11) adjacent field coils 116 in the outer cooling channel 206. In the example shown, the outer cooling channel 206 has been divided into two channels by the axial baffle 402 along which two outer flows 1004 flow. The axial flow continues until it reaches the other side of the yoke 112.

Figure 12:
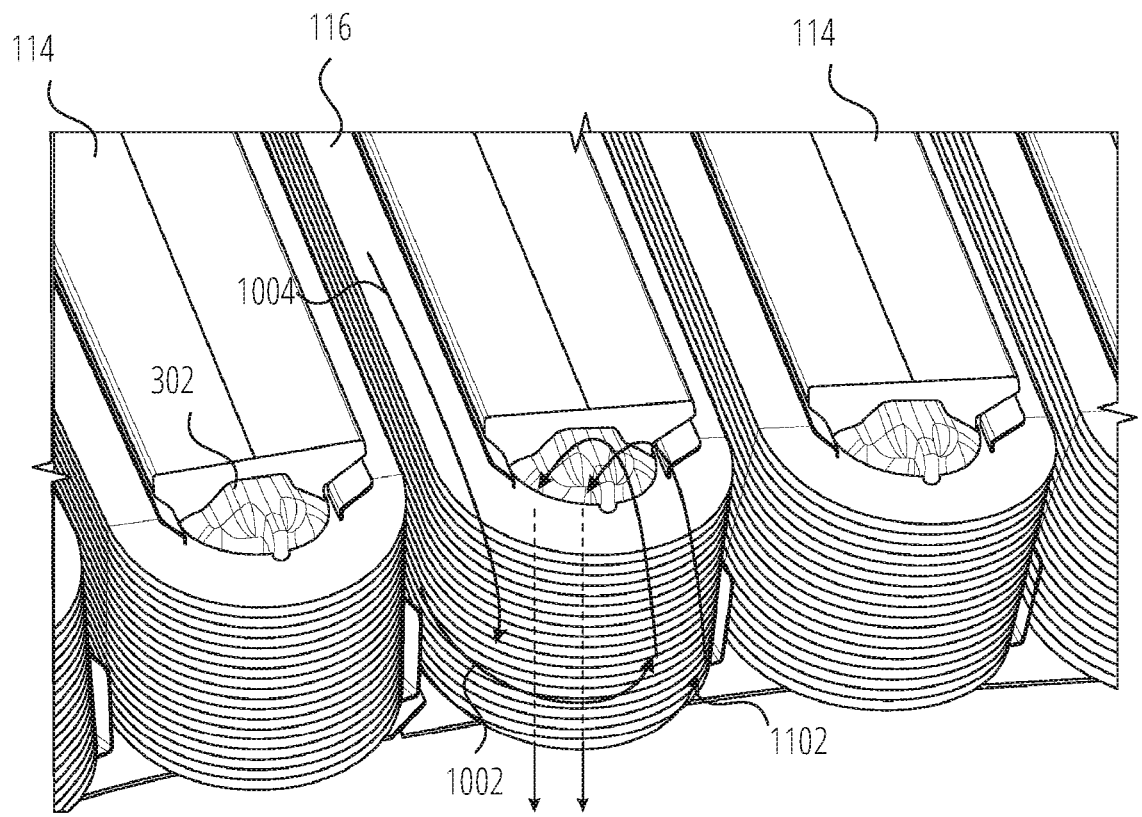
FIG. 12 shows the flow of the coolant around the end of the field coils as it leaves the axial cooling channels between the teeth according to some examples.

FIG. 12 shows the flow of the coolant around the end of the field coils 116 as it leaves the axial cooling channels between the teeth 114. The inner flow 1102, interstitial flow 1002 and outer flow 1004 leave the inner cooling channel 202, interstitial cooling channel 204 and outer cooling channel 206 respectively. The coolant then flows around the end of the field coil 116 between the end of the field coil and the circumferential baffle 802 in reverse as compared to the circumferential baffle 502 as described in FIG. 5. The coolant then passes over the ends of the field coils 116 and between the radial baffle 302 and the field coils 116. It then leaves the field coils 116 via a port 1304 in the circumferential baffle 802 (see FIG. 13).

Figure 13:
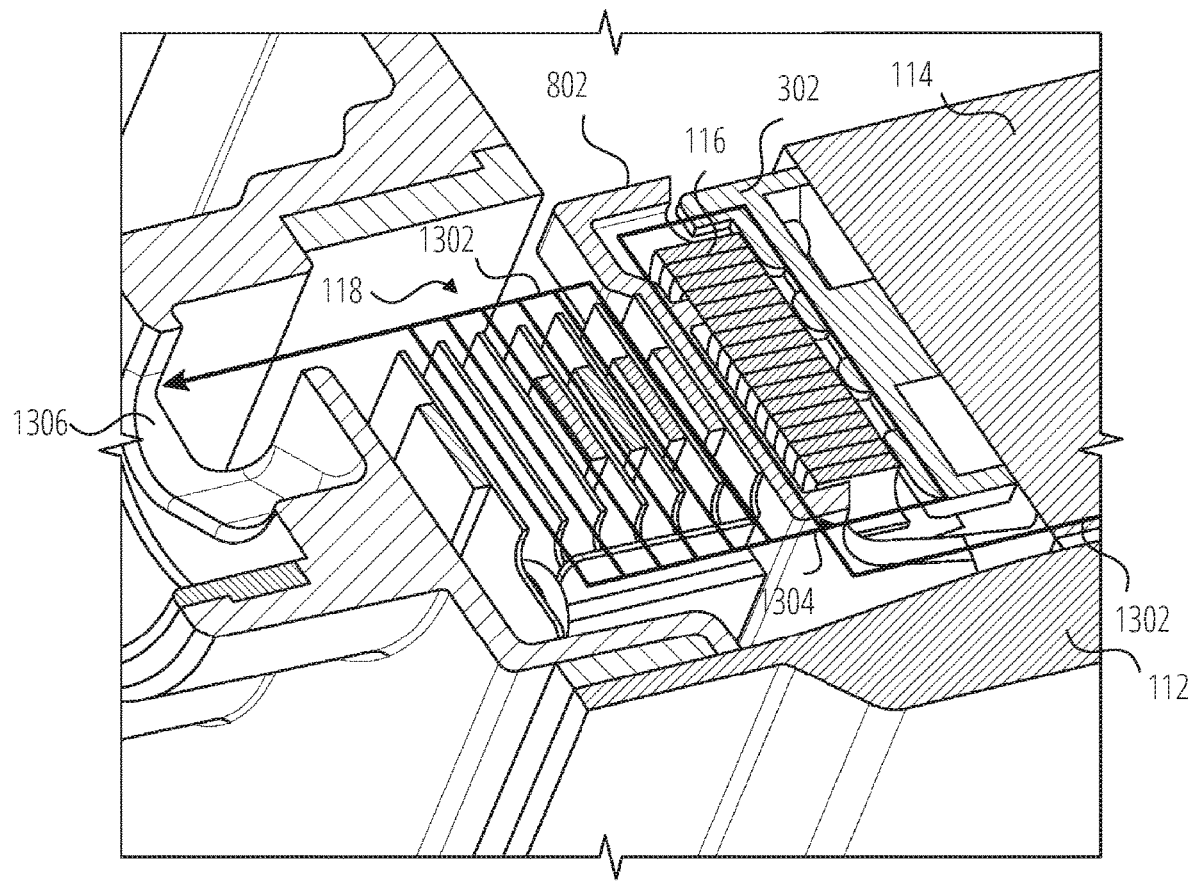
FIG. 13 shows the flow of the coolant as it leaves the axial cooling channels and passes through the electrical bussing of the motor according to some examples.

FIG. 13 shows the flow of the coolant as it leaves the axial cooling channels and passes through the electrical bussing 118. The axial coolant flows leave the axial cooling channels as discussed above. The coolant flow 1302 then passes between the field coil 116 and the circumferential baffle 802, over the end of the field coil 116 and then between the radial baffle 302 and the field coils 116. It then leaves the field coils 116 via a port 1304 in the circumferential baffle 802. As can be seen, the flow then passes through the electrical bussing 118 between the bus rings 808, before leaving via a port 1306 to go to a pump (not shown) that provides coolant circulation, as well as through a radiator (not show) or other heat transfer device. After passing through the pump and heat transfer device, the coolant flow returns to the inlet 702 to complete the coolant fluid circuit.

Figure 14:
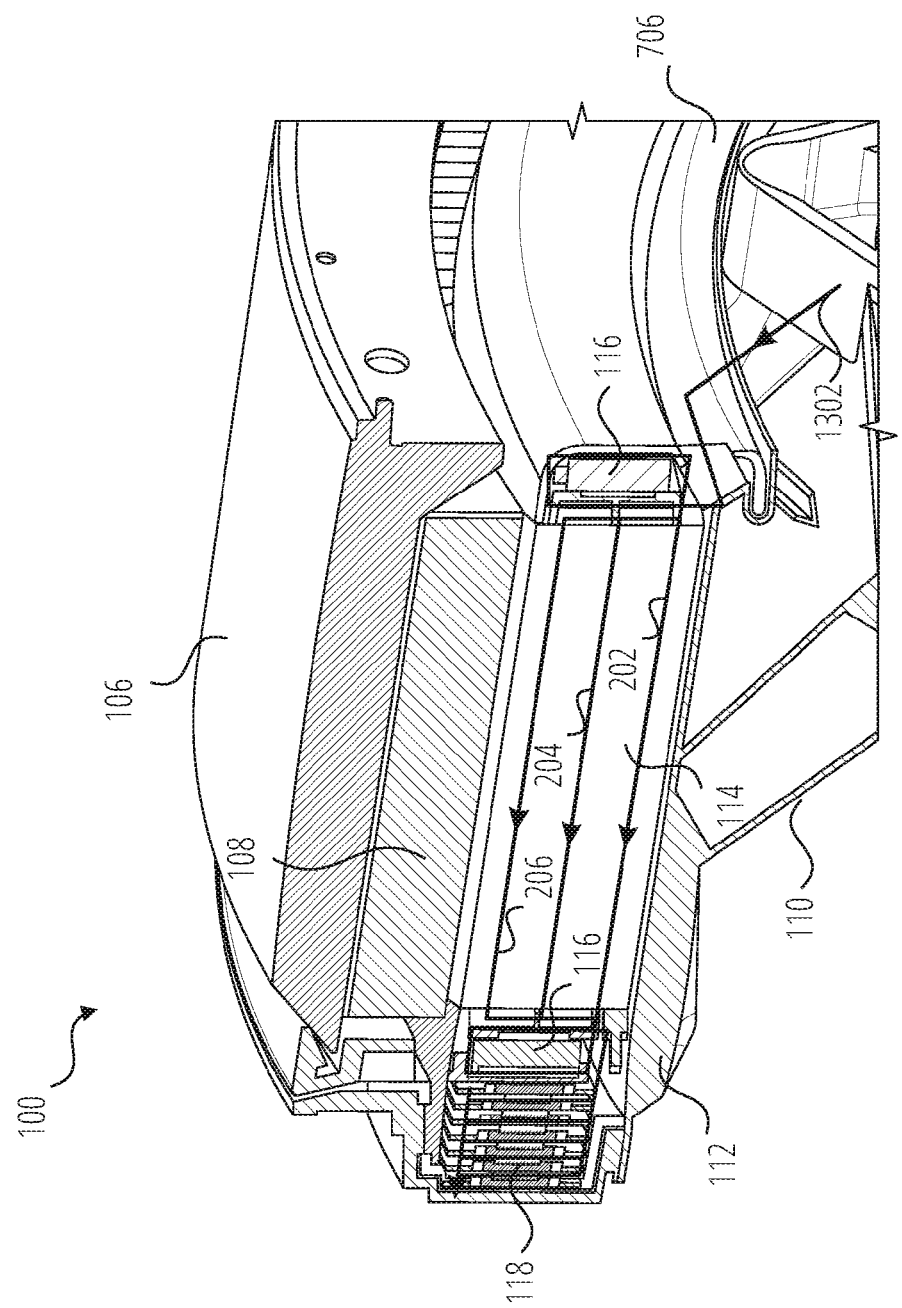
FIG. 14 shows the flow of coolant through the yoke from the time it enters the annular region 706 until it leaves the electrical bussing of the motor according to some examples.

FIG. 14 shows the overall flow of coolant through the yoke from the time it enters the annular region 706 until it leaves the electrical bussing 118. The coolant flows outward along the channels 704 of the stator housing 110 (see FIG. 7) and flows into the annular region 706. From the annular region 706, the coolant can flow outward into the circumferential baffle 502 through the ports 606.

The coolant then enters the field coils 116 between the radial baffles 302 and the ends of the field coils 116. The coolant then passes over the end of the field coils 116 and around the end of the field coil 116 between the end of the field coil 116 and the circumferential baffle 502 as discussed with reference to FIG. 5. The coolant flow then separates into an inner flow 1102 in an inner cooling channel 202, an interstitial flow 1002 in an interstitial cooling channel 204 and an outer flow 1004 in an outer cooling channel 206.

Upon reaching the back end of the yoke 112, the coolant flow then passes between the field coil 116 and the circumferential baffle 802, over the end of the field coil 116 and then between the radial baffle 302 and the field coils 116. The flow then passes through the electrical bussing 118 between the bus rings 808, before leaving to go to the pump and radiator or other heat transfer device to provide cooling and recirculation.

In another example, coolant flow direction is reversed relative to the illustrated example.

What is claimed is:

1. An electric motor comprising a rotor and a stator, the stator comprising:
   a yoke;
   a plurality of teeth mounted to the yoke and being aligned substantially parallel to an axis of rotation of the motor, each tooth including a first radial end adjacent to the yoke and a second radial end extending from the yoke;
   a plurality of field coils, each field coil being wrapped around a tooth;

a plurality of radial baffles, each radial baffle being located between an axial end of a tooth and a corresponding field coil;

a first coolant circulation path including a first coolant channel defined between adjacent field coils and a second coolant channel defined between adjacent field coils and between the first radial ends of adjacent teeth; and a second coolant circulation path including a third coolant channel defined outside field coil portions located at axial ends of each of the plurality of teeth, and a fourth coolant channel defined between each of the plurality of radial baffles and inside the corresponding field coil portion, the first coolant circulation path at a particular tooth being in fluid communication with the second coolant circulation path at the particular tooth such that coolant circulated to the yoke passes through both the first coolant circulation path and through the second coolant circulation path in use.

2. The electric motor of claim 1 further comprising a circumferential baffle around the axial ends of the plurality of teeth, wherein the circumferential baffle defines at least part of the third coolant channel to direct coolant flow around the field coil portions located at axial ends of the plurality of teeth.

3. The electric motor of claim 1 further comprising a fifth coolant channel defined between adjacent field coils and between the second radial ends of adjacent teeth.

4. The electric motor of claim 3 further comprising an axial baffle partly defining the fifth coolant channel.

5. The electric motor of claim 4 wherein the plurality of teeth include circumferential flanges, wherein the axial baffle is partly retained by the circumferential flanges of adjacent teeth.

6. The electric motor of claim 1 further comprising electrical bussing including a number of bus rings and a third coolant circulation path passing through the bus rings, the third coolant circulation path being in fluid communication with the first coolant circulation path and the second coolant circulation path such that coolant circulated to the yoke passes through the first coolant circulation path, the second coolant circulation path and the third coolant circulation path in use.

7. An electric motor comprising a rotor and a stator, the stator comprising:

a yoke;

a plurality of teeth being aligned substantially parallel to an axis of rotation of the motor, each tooth including a first radial end adjacent to the yoke and a second radial end extending from the yoke;

a plurality of field coils, each field coil being wrapped around a tooth;

at least one radial baffle located over axial ends of the plurality of teeth;

a first coolant circulation path including a first coolant channel defined below the field coils and between the first radial ends of adjacent teeth and a second coolant channel defined above the field coils and between the second radial ends of adjacent teeth; and a second coolant circulation path including a third coolant channel defined outside field coil portions located at axial ends of the plurality of teeth, and a fourth coolant channel defined between the at least one radial baffle and inside the field coil portions located at axial ends of the plurality of teeth, the first coolant circulation path being in fluid communication with the second coolant circulation path such that coolant circulated to the yoke passes through both the first coolant circulation path and through the second coolant circulation path in use.

8. The electric motor of claim 7 further comprising a fifth coolant channel defined between adjacent field coils.

9. The electric motor of claim 8 further comprising an axial baffle partly defining the fifth coolant channel.

10. The electric motor of claim 8 further comprising electrical bussing including a number of bus rings and a third coolant circulation path passing between the bus rings, the third coolant circulation path being in fluid communication with the first coolant circulation path and the second coolant circulation path such that coolant circulated to the yoke passes through the first coolant circulation path, the second coolant circulation path and the third coolant circulation path.

11. The electric motor of claim 8 further comprising a circumferential baffle around axial ends of the plurality of teeth, wherein the circumferential baffle defines at least part of the third coolant channel to direct coolant flow around the field coil portions located at axial ends of the plurality of teeth.

12. The electric motor of claim 7 further comprising a circumferential baffle around axial ends of the plurality of teeth, wherein the circumferential baffle defines at least part of the third coolant channel to direct coolant flow around the field coil portions located at axial ends of the plurality of teeth.

13. A method of cooling an electric motor comprising a rotor and a stator, the stator comprising:

a yoke;

a plurality of teeth being aligned substantially parallel to an axis of rotation of the motor, each tooth including a first radial end adjacent to the yoke and a second radial end extending from the yoke;

a plurality of field coils, each field coil being wrapped around a tooth at least one radial baffle located over axial ends of the plurality of teeth, the method comprising:

circulating a coolant through a coolant circulation path including:

a first coolant channel defined between adjacent field coils;

a second coolant channel defined between adjacent field coils and between the first radial ends of adjacent teeth:

a third coolant channel defined outside field coil portions located at axial ends of the plurality of teeth; and a fourth coolant channel defined between the at least one radial baffle and inside the field coil portions located at axial ends of the plurality of teeth.

14. The method of claim 13 further comprising:

circulating a coolant through a fifth coolant channel defined between adjacent field coils and between the second radial ends of adjacent teeth.

15. The method of claim 13 wherein the motor further comprises electrical bussing including a number of bus rings, the method further comprising circulating the coolant between the bus rings.

* * * * *